US008258941B2

(12) United States Patent
Case, Jr.

(10) Patent No.: US 8,258,941 B2
(45) Date of Patent: *Sep. 4, 2012

(54) FOOTWEAR PRODUCTS INCLUDING DATA TRANSMISSION CAPABILITIES

(75) Inventor: Charles W. Case, Jr., Lake Oswego, OR (US)

(73) Assignee: Nike, Inc., Beaverton, OR (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/506,846

(22) Filed: Jul. 21, 2009

(65) Prior Publication Data

US 2009/0284368 A1   Nov. 19, 2009

Related U.S. Application Data

(63) Continuation of application No. 11/407,353, filed on Apr. 20, 2006, now Pat. No. 7,579,946.

(51) Int. Cl.
*G08B 1/08* (2006.01)
(52) U.S. Cl. ..................... 340/539.1
(58) Field of Classification Search ............... 340/539.1, 340/539.11, 539.15, 825.36, 10.52; 455/562.1; 702/160
See application file for complete search history.

(56) References Cited

U.S. PATENT DOCUMENTS

| | | | |
|---|---|---|---|
| 3,834,702 A | 9/1974 | Bliss | |
| 4,817,950 A | 4/1989 | Goo | |
| 4,870,700 A * | 9/1989 | Ormanns et al. | 455/92 |
| 5,001,632 A | 3/1991 | Hall-Tipping | |
| 5,076,584 A | 12/1991 | Openiano | |
| RE34,728 E | 9/1994 | Hall-Tipping | |
| 5,362,069 A | 11/1994 | Hall-Tipping | |
| 5,667,459 A | 9/1997 | Su | |
| 5,734,370 A | 3/1998 | Skodlar | |
| 5,748,087 A | 5/1998 | Ingargiola et al. | |
| 5,864,333 A | 1/1999 | O'Heir | |
| 5,941,797 A | 8/1999 | Kashiwaguchi | |
| 5,947,868 A | 9/1999 | Dugan | |
| 5,989,157 A | 11/1999 | Walton | |

(Continued)

FOREIGN PATENT DOCUMENTS

DE   20 2004 012749 U1   10/2004

(Continued)

OTHER PUBLICATIONS

International Search Report in corresponding PCT Application, International Application No. PCT/US2007/009523, mailed Oct. 22, 2007.

(Continued)

*Primary Examiner* — Phung Nguyen
(74) *Attorney, Agent, or Firm* — Banner & Witcoff, Ltd.

(57) ABSTRACT

Footwear systems include an article of footwear and a data transmission system engaged with the article of footwear. The transmission system transmits data to a remote system, such as a display system, another data transmission system, a processing system, etc. Such footwear systems further may include activation systems for activating the transmission and/or display systems. The transmitted data may be used for various purposes, such as: (a) identifying a user of the article of footwear; (b) activating targeted advertising or product information; (c) confirming the user's presence at a specific location and/or at a specific time; (d) determining start, finish, and/or intermediate split times for specific user; (e) confirming athletic equipment usage; (f) providing data for a game or reward program; (g) registering the user for an event or competition; or the like.

13 Claims, 9 Drawing Sheets

U.S. PATENT DOCUMENTS

| | | |
|---|---|---|
| 6,013,007 A | 1/2000 | Root et al. |
| 6,024,675 A | 2/2000 | Kashiwaguchi |
| 6,213,872 B1 | 4/2001 | Harada et al. |
| 6,302,789 B2 | 10/2001 | Harada et al. |
| 6,447,424 B1 | 9/2002 | Ashbey et al. |
| 6,582,342 B2 | 6/2003 | Kaufman |
| 6,585,622 B1 | 7/2003 | Shum et al. |
| 6,788,200 B1 | 9/2004 | Jamel et al. |
| 6,813,582 B2 | 11/2004 | Levi et al. |
| 6,881,176 B2 | 4/2005 | Oishi et al. |
| 7,171,331 B2 | 1/2007 | Vock et al. |
| 7,254,516 B2 | 8/2007 | Case, Jr. et al. |
| 2002/0160883 A1 | 10/2002 | Dugan |
| 2004/0046692 A1 | 3/2004 | Robson et al. |
| 2004/0079797 A1 | 4/2004 | Wadley |
| 2004/0153007 A1* | 8/2004 | Harris et al. ............ 600/587 |
| 2004/0171460 A1 | 9/2004 | Park |
| 2005/0174243 A1* | 8/2005 | Musil ..................... 340/574 |
| 2005/0227811 A1 | 10/2005 | Shum et al. |
| 2006/0020421 A1* | 1/2006 | Darley et al. ............ 702/182 |
| 2006/0025282 A1 | 2/2006 | Redmann |
| 2006/0103538 A1* | 5/2006 | Daniel ..................... 340/574 |
| 2006/0121992 A1 | 6/2006 | Bortnik et al. |
| 2006/0230640 A1* | 10/2006 | Chen ......................... 36/136 |
| 2006/0259311 A1 | 11/2006 | Stadler et al. |
| 2007/0287596 A1 | 12/2007 | Case, Jr. et al. |
| 2008/0077489 A1 | 3/2008 | Gilley et al. |

FOREIGN PATENT DOCUMENTS

| | | |
|---|---|---|
| EP | 1134555 A1 | 9/2001 |
| GB | 2421416 A | 6/2006 |
| JP | 08-089482 | 4/1996 |
| JP | 2004-187808 A | 7/2004 |
| JP | 2004-261555 A | 9/2004 |
| JP | 2004-313407 | 11/2004 |
| JP | 2004-538053 | 12/2004 |
| JP | 2005-144106 | 6/2005 |
| WO | 01/69179 A | 9/2001 |

OTHER PUBLICATIONS

International Preliminary Report on Patentability in corresponding PCT Application, International Application No. PCT/US2007/009523, mailed Oct. 30, 2008.

Non-Final Office Action dated Oct. 28, 2008 in U.S. Appl. No. 11/769,545.

Non-Final Office Action dated Jan. 20, 2006 in U.S. Appl. No. 11/014,241.

First Office Action issued in corresponding Chinese Application, Application No. 200780018062.3, on Jul. 9, 2010.

Office Action issued in corresponding Chinese application, Application No. 200780018062.3 on Mar. 24, 2011.

Notice of Reasons for Rejection received in related Japanese Application, Application No. 2009-506569, issued Jul. 27, 2011.

Office Action received in related European Application, Application No. 07 755 698.3, issued Jun. 28, 2011.

Translation of Decision of Rejection for Japanese Patent Application No. 2009-506569 mailed Jan. 11, 2012, 1 page.

* cited by examiner

FOOTWEAR PRODUCTS INCLUDING DATA TRANSMISSION CAPABILITIES

RELATED APPLICATION DATA

This application is a continuation of U.S. patent application Ser. No. 11/407,353 filed Apr. 20, 2006 and entitled "Footwear Products Including Data Transmission Capabilities" (now U.S. Pat. No. 7,579,946, issued Aug. 25, 2009). This Parent application is entirely incorporated herein by reference.

FIELD OF THE INVENTION

This invention relates generally to articles of footwear that include data transmission capabilities, e.g., to enable communications and interactions with remote devices. At least some further aspects of this invention relate to activation systems to activate and/or otherwise control the data transmission process.

BACKGROUND

Conventional articles of footwear have included two primary elements, namely an upper member and a sole structure. The upper member provides a covering for the foot that receives and positions the foot with respect to the sole structure. The upper member may be made from a wide variety of materials, including, for example, leather, canvas, rubber (natural or synthetic), polymeric materials, fabric, and the like. In addition, the upper member may have a configuration that protects the foot and provides ventilation, thereby cooling the foot and removing perspiration. The sole structure generally is secured to a lower portion of the upper member and generally is positioned between the foot and the contact surface (the terms "contact surface" or "surface," as used herein, include any foot or footwear contact surface, including but not limited to: grass, dirt, snow, ice, tile, flooring, carpeting, synthetic grass, asphalt, cement, concrete, clay, court surfaces, and the like). In addition to attenuating ground reaction forces, the sole structure may provide traction and help control foot motion, such as pronation. Accordingly, the upper member and the sole structure operate cooperatively to provide a comfortable structure that is suited for a variety of ambulatory activities, such as walking and running.

The sole member of athletic footwear, in at least some instances, will exhibit a layered configuration that includes a comfort-enhancing insole, a resilient midsole (e.g., formed, at least in part, from a polymer foam material), and a ground-contacting outsole that provides both abrasion-resistance and traction. The midsole, in at least some instances, will be the primary sole structure element that attenuates ground reaction forces and controls foot motion. Suitable polymer foam materials for use as at least portions of the midsole include ethylvinylacetate ("EVA") or polyurethane ("PU") that compress resiliently under an applied load to attenuate ground reaction forces. Conventional polymer foam materials are resiliently compressible, in part, due to the inclusion of a plurality of open or closed cells that define an inner volume substantially displaced by gas. The upper member and sole structure in footwear products may be joined to one another in various different ways, such as using cements or adhesives, stitching or sewing, mechanical connectors, fusing techniques, or the like.

SUMMARY

The following presents a general summary of aspects of this invention in order to provide a basic understanding of at least some aspects of the invention. This summary is not intended as an extensive overview of the invention. It is not intended to identify key or critical elements of the invention or to delineate the scope of the invention. The following summary merely presents some concepts of the invention in a general form as a prelude to the more detailed description provided below.

Aspects of this invention relate to generally to footwear systems (e.g., including athletic footwear, etc.) that include data transmission capabilities. Such systems may include, for example: (a) an article of footwear including an upper member and a sole member engaged with the upper member; and (b) a data transmission system engaged with the article of footwear, wherein the data transmission system transmits data from the article of footwear for receipt by a remote system. The data transmission systems in accordance with at least some examples of this invention may be used in conjunction with systems and methods for monitoring athletic performance and/or systems for providing advertising and/or product information relating to the article of footwear and/or products useful in athletic activities engaged in while wearing the article of footwear. The data transmitted by the data transmission system may be useful in such systems and methods. Optionally, footwear systems in accordance with at least some examples of this invention further may include an activation system engaged with the article of footwear for activating the data transmission system and/or a display device in communication with the data transmission system for displaying information based, at least in part, on the data transmitted by the data transmission system.

Additional aspects of this invention relate to data transfer systems. Such systems may include: (a) an article of footwear; (b) a data transmission system engaged with the article of footwear, wherein the data transmission system transmits data from the article of footwear; and (c) a remote system in communication with the data transmission system for receiving the data from the data transmission system. The remote system may include, for example, a display device, another data transmission system, e.g., for transmitting data to another independent system or device, and/or a computer or other data processing system. The remote system may be used, for example, to monitor athletic performance and/or provide targeted product and/or advertising information based on the information transmitted by the data transmission system.

Still additional aspects of this invention relate to methods of making footwear and/or data transfer systems, e.g., of the various types described above. As one example, aspects of the invention relate to methods of producing footwear systems that include: (a) providing an article of footwear including an upper member and a sole member engaged with the upper member; and (b) engaging a data transmission system with the article of footwear, wherein the data transmission system transmits data from the article of footwear for receipt by a remote system (e.g., athletic performance data, data used in monitoring athletic performance, data used in providing targeted and/or customize advertising and/or product information, etc.). Such methods further may include engaging an activation system with the article of footwear and/or providing a display device for displaying information based, at least in part, on the data transmitted by the data transmission system. Methods of providing data transfer systems in accordance with at least some examples of this invention may include, for example: (a) engaging a data transmission system with an article of footwear, wherein the data transmission system transmits data from the article of footwear (e.g., data of the types useful in the various systems and/or methods described above); and (b) providing a remote system in communication with the data transmission system for receiving the data from the data transmission system. If desired, the remote system may include one or more of: a display device for displaying information based at least in part on data transmitted by the data transmission system, another data transmission system, a remote computer or data processing system, and the like.

Still other methods in accordance with at least some examples of this invention relate to data transfer methods that utilize, for example, footwear systems and/or data transfer systems of the types described above. Such methods may include, for example: (a) activating a data transmission system engaged with an article of footwear (e.g., engaged with the sole member and/or upper member, included as an integral part of the structure of the article of footwear, engaged with the article of footwear via a tag member, etc.); and (b) transmitting data from the article of footwear to a remote system. As noted above, the transmitted data may include, for example, athletic performance data, data used in monitoring athletic performance, data used in providing targeted and/or customized advertising or product information, etc. Some additional aspects of this invention may include, for example: displaying information to the footwear user and/or others based on the data transmitted by the data transmission system; and/or transmitting data from the remote system to another remote system (e.g., to the wearer of the article of footwear or others), wherein the data or information transmitted to the second remote system is determined, at least in part, based on the original data transmitted to the remote system. Additional methods in accordance with at least some examples of this invention further may include one or more additional steps, such as: (a) identifying a user of the article of footwear based on the data transmitted by the data transmission system; (b) displaying advertising or product information to the user based, at least in part, on the data transmitted by the data transmission system; (c) correlating a presence of a user of the article of footwear to a specific location and/or at a specific time based on the data transmitted by the data transmission system; (d) determining race or event start, finish, and/or intermediate split times for a user of the article of footwear based on the data transmitted by the data transmission system; (e) determining a user's presence at and/or use of a specific piece of exercise equipment, a specific gym or exercise facility, a specific retail sales location, or the like based on the data transmitted by the data transmission system; (f) providing data for a game or reward program based on the data transmitted by the data transmission system; (g) registering a user of the article of footwear for an event or competition based on the data transmitted by the data transmission system; (h) identifying a specific article of footwear (e.g., by owner, by model or style, by manufacturer's lot, etc.) based on the data transmitted by the data transmission system; (i) providing data indicating athletic performance information associated with the use of the article of footwear based on the data transmitted by the data transmission system (e.g., shoe mileage, speed, and/or timing information, etc.); (j) activating display or presentation of product specific information (e.g., advertising information) based on data transmitted by the data transmission system; (k) activating display or presentation of user specific or customized product information (e.g., advertising information) based on data transmitted by the data transmission system; (l) displaying information to the user, e.g., route information, timing information, split times, distance information, warning information, etc.; or the like.

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein.

DETAILED DESCRIPTION

Figure 1:
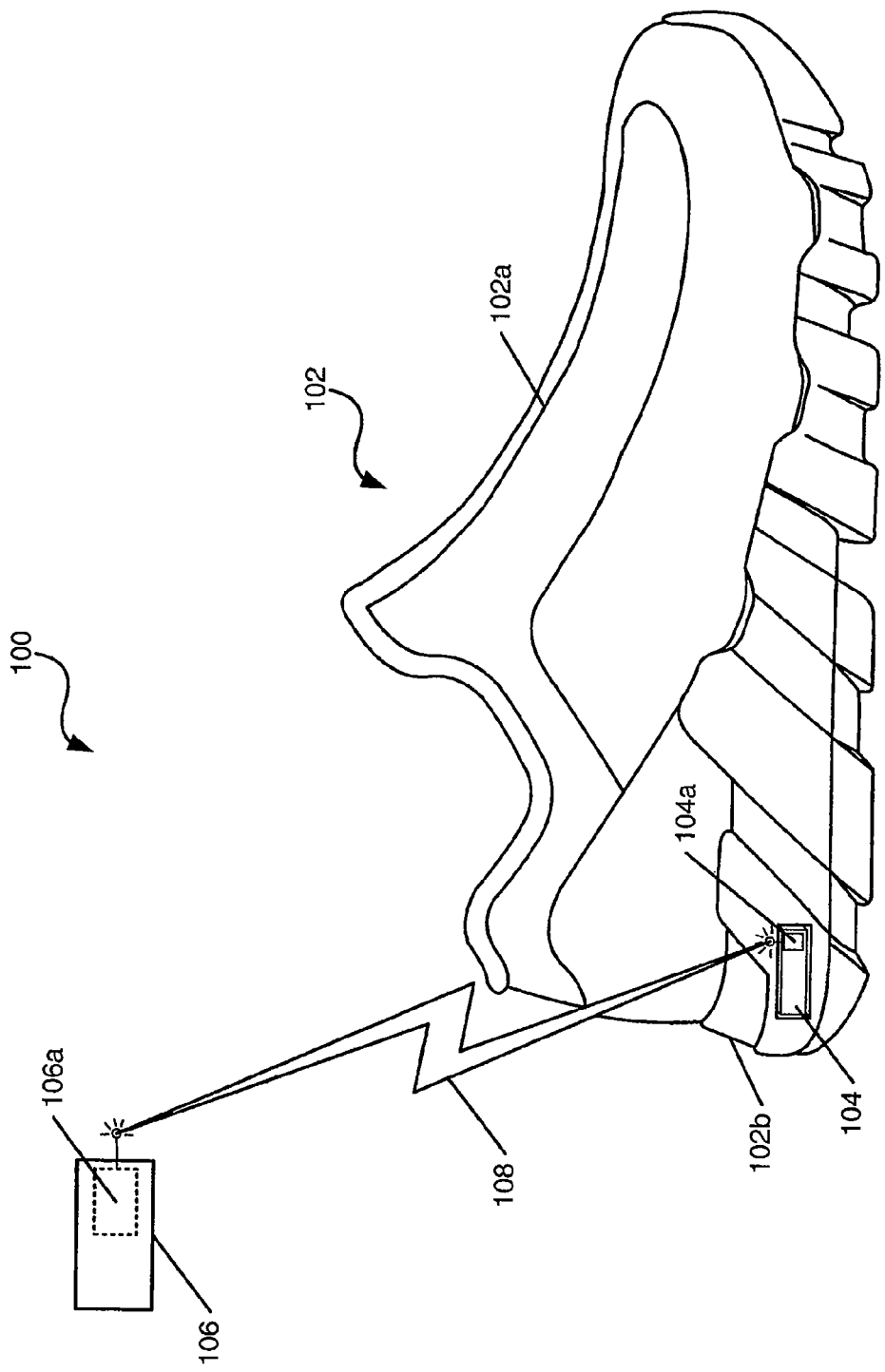
FIG. 1 generally illustrates an example environment and system in which aspects of the invention may be practiced.

In the following description of various examples of the invention, reference is made to the accompanying drawings, which form a part hereof, and in which are shown by way of illustration various example systems and environments in which aspects of the invention may be practiced. It is to be understood that other specific arrangements of parts, example systems, components, and environments may be utilized and structural and functional modifications may be made to the described arrangements and systems without departing from the scope of the present invention. Also, while the terms "top," "bottom," "side," "front," "back," "above," "below," "under," "over," and the like may be used in this specification to describe various example features and elements of the invention, these terms are used herein as a matter of convenience, e.g., based on the example orientations shown in the figures and/or a typical orientation during a typical use. Nothing in this specification should be construed as requiring a specific three dimensional orientation of structures in order to fall within the scope of this invention.

A. General Description of Footwear and Data Transferring Systems, Methods of Making Them, and Methods of Using Them According to the Invention 1. Footwear and Data Transfer Systems Some aspects of the present invention relate generally to footwear systems that include data transmission capabilities. Such systems may include, for example: (a) an article of footwear including an upper member and a sole member engaged with the upper member; and (b) a data transmission system engaged with the article of footwear, wherein the data transmission system transmits data from the article of footwear for receipt by a remote system. The transmitted data may include athletic performance data, data used in monitoring athletic performance, and/or data used in providing targeted or customized advertising or product information. Optionally, footwear systems in accordance with at least some examples of this invention further may include an activation system engaged with the article of footwear for activating the data transmission system. The data transmission system and/ or the activation system may be engaged with any portion of the article of footwear in any desired manner, e.g., with the sole member, with the upper member, attached via a tag member (e.g., a hanging tag connected to the article of footwear, etc.), etc. The data transmission system and the activation system, when both present, may be provided as separate elements, provided in a common housing or substrate, provided as separate components, or otherwise provided in any desired manner without departing from this invention.

When present, any type of activation system may be used without departing from this invention. As more specific examples, activation systems including an accelerometer, a piezoelectric element, a Hall sensor system or other magnetic sensing system, a radio frequency identification ("RFID") system, a physical button or other switching mechanism, and the like may be used in various examples of this invention. Footwear systems in accordance with at least some examples of this invention may use an RFID system for both activating the data transmission system and actually transmitting the desired data (e.g., transmitting user identification data, product or footwear identification data, athletic performance data, etc. via the RFID transmission system).

Any type of activation action also may be used to activate the data transmission system without departing from this invention. For example, data transmission may be activated or initiated in response to an external input received at an input system in at least some examples of this invention. The input system may receive user input in a wireless manner, such as via radio waves (e.g., the input system including a radio antenna, such as an RFID system, etc.), via magnetic fields (e.g., the input system including a Hall sensing system or other magnetic field sensor to detect magnetic fields or changes in magnetic fields, etc.), infrared transmission systems, and the like. As still additional examples, contact between the sole member of the article of footwear and a surface, such as a ground surface or floor surface, may be sensed or detected and used to activate the data transmission system. In this manner, if desired, data may be transmitted by the data transmission system, e.g., as a result of a user's step (e.g., while walking, running, or jogging, etc.), as a result of landing a jump, as a result of a stomping action, or the like while the user wears the article of footwear.

Data may be made available to the article of footwear and/or made available for transmission by the data transmission system included with the article of footwear for any desired purpose, it may include any desired content, and/or it may be provided in any desired form or format without departing from this invention. Desired data may be input to the article of footwear (e.g., to a memory or other processing system included in or on the article of footwear) at any desired time and/or in any desired manner without departing from this invention, for example, at a manufacturing, wholesaler, or retail location; at a point of sale location; at a point of use location; by the user at home or at another location (e.g., via a personal computer or over a computer network); at special locations designated for this type of input (e.g., at a kiosk in a retail location or mall, etc.); or the like. Any content may be input to the article of footwear and/or made available for transmission from the article of footwear without departing from the invention. In some examples of this invention, the data transmission system may transmit data identifying a particular user of the article of footwear (e.g., the purchaser, etc.). Such data may be used, for example, for athletic performance monitoring purposes, e.g., to correlate or confirm the user's presence at a specific location and/or at a specific time. As more specific examples, transmission of data identifying the user or wearer of an article of footwear at specific times and/or specific locations may be used for athletic performance monitoring purposes, for example: for automatically determining and logging race or event start, finish, and/or split times for the user; for use in games, competitions, challenges, or reward programs; for use in automatically determining and logging user gym or exercise facility use (e.g., even to confirm use of specific pieces of equipment at the gym or exercise facility, the timing and/or length of use, etc.); for use in automatically registering a user for an event or competition; etc. User identification data also may be transmitted for use in confirming user presence at retail, sales, promotional, or other event locations (e.g., for contests, award or reward programs, etc.).

As still other examples, data transmitted by the data transmission systems in accordance with examples of this invention may include data identifying the article of footwear, such as the model or style of the article of footwear. Such data may be used by the receiving system to trigger advertising or other informational audio or video displays that contain product specific or other targeted information, e.g., at a retail location. The data transmitted by the data transmission system also may include athletic performance information associated with use of the article of footwear, such as total mileage on the article of footwear, user speed and/or event timing information (e.g., start, finish, split times, etc.), information for use in a game or reward program, average workout times, speeds, or distances, etc.

Footwear and/or data transfer systems in accordance with still additional examples of this invention may include a display device in communication with the data transmission system for displaying information based, at least in part, on the data transmitted by the data transmission system (e.g., the remote system to which the data is transmitted may include a display device). Of course, any type of information may be displayed without departing from the invention, such as athletic performance information associated with use of the article of footwear; start/finish/split time information for an event; information relating to a game or reward program; user identification information (e.g., for event registration, athletic performance, games or rewards, or other purposes); product or advertising information; and/or the like. If desired, in accordance with at least some examples of this invention, the display device may be engaged with the article of footwear, e.g., incorporated and integrated into its structure, attached to it, etc.

Additional aspects of this invention, as mentioned above, relate to data transfer systems. Such systems may include: (a) an article of footwear; (b) a data transmission system engaged with the article of footwear, wherein the data transmission system transmits data from the article of footwear (e.g., the data may include, for example, the various types of content described above); and (c) a remote system in communication with the data transmission system for receiving the data from the data transmission system. The remote system may be used for practicing various features and aspects of the invention as described above.

The remote system may include various components, elements, or characteristics without departing from the invention. For example, the remote system may include a display device for displaying information based at least in part on data transmitted by the data transmission system. Additionally or alternatively, the remote system may include another data transmission system, e.g., for transmitting data to another independent system or device, such as a portable display device or other system carried by the footwear wearer (e.g., to provide split time information, route information (e.g., approaching features, warnings, approaching water or first aid stations, etc.), current race standings or other information, etc.). As still additional examples, the remote system may receive data identifying the article of footwear, and the remote system may use this information to activate specific advertisements or product information, e.g., directed to this specific product line and/or related products.

2. Methods of Making Footwear and Data Transfer Systems

Additional aspects of this invention relate to methods of making footwear and/or data transfer systems, e.g., of the various types described above. One aspect of this invention relates to methods of producing footwear systems that include: (a) providing an article of footwear, e.g., including an upper member and a sole member engaged with the upper member; and (b) engaging a data transmission system with the article of footwear, wherein the data transmission system transmits data from the article of footwear for receipt by a remote system. The data transmitted by the data transmission system may include athletic performance data, data used in monitoring athletic performance, data used in providing customized and/or targeted advertising, etc. Such methods further may include engaging an activation system with the article of footwear (wherein the activation system is operatively arranged so as to activate the data transmission system) and/or providing a display device (optionally engaged with the article of footwear) for displaying information based, at least in part, on the data transmitted by the data transmission system. The activation system, in accordance with at least some examples of this invention, may be contained in a common housing and/or fixed on a common card or board with the data transmission system, such that the activation system and the data transmission system may be engaged with the article of footwear simultaneous in one action. Footwear systems according to examples of this invention may be used in and/or with any of the various systems described above and/or for any of the various purposes described above. Additionally, the footwear systems according to at least some examples of this invention may include, inter alia, any and/or all of the various features, elements, components, and/or characteristics described above.

Methods of providing data transfer systems in accordance with at least some examples of this invention may include, for example: (a) engaging a data transmission system with an article of footwear, wherein the data transmission system transmits data from the article of footwear; and (b) providing a remote system in communication with the data transmission system for receiving the data from the data transmission system. The transmitted data may include content like that described above. If desired, the remote system may include one or more of: a display device for displaying information based at least in part on data transmitted by the data transmission system, another data transmission system (e.g., for transmitting data to another system, such as to another display device, to a portable display device at the user's location (e.g., carried by the user), to a remote computer or data processing system, to a registration system, etc.), and the like.

Methods in accordance with these various examples of the invention further may include: providing a portable or other display device for displaying information based, at least in part, on data transmitted by the data transmission system and/or the remote system. The data transfer systems according to at least some examples of this invention may be used in and/or with any of the various systems described above and/or for any of the various purposes described above. Additionally, the data transfer systems according to at least some examples of this invention may include, inter alia, any and/or all of the various features, elements, components, and/or characteristics described above.

3. Methods of Using Footwear and Data Transfer Systems

Additional aspects of this invention relate to data transfer method using, for example, footwear systems and/or data transfer systems, e.g., of the types described above. Such methods may include: (a) activating a data transmission system engaged with an article of footwear (e.g., engaged with the sole member and/or upper member included as part of the article of footwear, engaged with a tag member attached to the article of footwear, etc.); and (b) transmitting data from the article of footwear to a remote system. The transmitted data may include, for example, athletic performance data, data used in monitoring athletic performance, data used in providing targeted and/or customized advertising, etc. Some additional example aspects of this invention include, for example: displaying information to the footwear user and/or others based on the data transmitted by the data transmission system; and/or transmitting data from the remote system to another remote system (e.g., to the wearer of the article of footwear or others), wherein the data transmitted to the second remote system is determined, at least in part, based on the original data transmitted to the remote system.

The activating step may take place in any desired manner and in a wide variety of different ways without departing from this invention. For example, the activating step may be triggered in response to output generated by an accelerometer, a piezoelectric element, a Hall sensor system or other magnetic sensor system, or the like. As additional examples, the activating step may include exposing the article of footwear to radio waves, e.g., at a predetermined frequency, and the transmitting then may occur, e.g., via an RFID system triggered in response to the exposing of the article of footwear to the radio waves. As still additional examples, the activating step may include interacting with a switch or button operatively connected the data transmission system, contacting a sole member of the article of footwear with the ground or other surface (e.g., during a step, landing a jump, as part of a stomping action, etc.), etc.

Methods according to at least some examples of the invention may receive any type of input (e.g., of the types described above) and use that input to trigger the activating step and/or to ultimately trigger data transmission. In accordance with at least some examples of this invention, the input will be received in a wireless manner, such as via a radio antenna, through radio waves, through magnetic fields (or sensed changes in a magnetic field), via contact or interaction with an external member (such as via contact between a sole member of the article of footwear and a surface, pressing a button, etc.), and the like.

Additional methods in accordance with at least some examples of this invention further may include one or more additional steps, such as: (a) identifying a user of the article of footwear based on the data transmitted by the data transmission system; (b) displaying advertising or product information to the user based, at least in part, on the data transmitted by the data transmission system; (c) correlating a presence of a user of the article of footwear with a specific location and/or at a specific time based on the data transmitted by the data transmission system; (d) determining race or event start, finish, and/or intermediate split times for a user of the article of footwear based on the data transmitted by the data transmission system; (e) determining a user's presence at and/or use of a specific piece of exercise equipment, a specific gym or exercise facility, a specific retail sales location, or the like based on the data transmitted by the data transmission system; (f) providing data for a game or reward program based on the data transmitted by the data transmission system; (g) registering a user of the article of footwear for an event or competition based on the data transmitted by the data transmission system; (h) identifying a specific article of footwear (e.g., by owner, by model or style, manufacturer's lot number, GUID, etc.) based on the data transmitted by the data transmission system; (i) providing data indicating athletic performance information associated with use of the article of footwear based on the data transmitted by the data transmission system (e.g., shoe mileage, speed and/or timing information, average speed, average workout times or distances, etc.); (j) activating display or presentation of product specific information (e.g., advertising information) based on data transmitted by the data transmission system; (k) activating display or presentation of user specific or customized product information (e.g., advertising information) based on data transmitted by the data transmission system; (l) displaying information to the user, e.g., route information, timing information, split times, distance information, warning information etc.; or the like.

Specific examples of structures according to examples of the invention are described in more detail below. The reader should understand that these specific examples and structures are set forth merely to illustrate the invention, and they should not be construed as limiting the invention.

B. Specific Examples of the Invention

The various figures in this application illustrate examples of footwear systems, data transfer systems, and methods of making and using these systems according to examples of this invention. When the same reference number appears in more than one drawing, that reference number is used consistently in this specification and the drawings to refer to the same or similar parts throughout.

FIG. 1 generally illustrates a data transfer system 100 in accordance with at least some examples of this invention. In this example, the data transfer system 100 includes an article of footwear 102 and a data transmission system 104 engaged with the article of footwear 100. The data transmission system 104 of this example system 100 transmits data from the article of footwear 102 to a remote system 106 that, in this example system 100, is in wireless electronic communication with the data transmission system 104 (as shown by transmission arrow 108).

The article of footwear 102 may be of any desired construction without departing from this invention. For example, the article of footwear 102 may include an upper member 102a engaged with a sole member 102b in any desired manner, such as via stitching, adhesives, cements, mechanical connectors, fusion techniques, and the like, including in conventional manners known and used in the art. The article of footwear 102 may be of any desired construction, made up of any desired materials (including the specific materials mentioned above), and may include any desired type of closure system (such as laces, buckles, hook-and-look fasteners, magnetic closure systems, clamps, clasps, other mechanical connectors, retaining elements, and the like) or no closure system. In general, the article of footwear 102 may represent any of many conventional footwear structures, including athletic footwear type structures and/or structures known and available in the art.

The data transmission system 104 may be engaged with the article of footwear 102 in any desired manner without departing from the invention. For example, the data transmission system 104 may be integrally formed with the article of footwear 102 during manufacture such that the data transmission system 104 is fully or partially concealed within the remainder of the structure of the article of footwear 102. As another example, if desired, the data transmission system 104 may fit into a pocket, slot, groove, or other structure integrally formed in or on the article of footwear 102 (e.g., formed in or on the upper member 102a or in or on any portion of the sole member 102b) such that the data transmission system 104 may be removably inserted into and/or otherwise attached with the article of footwear 102 and freely engageable with and/or detachable therefrom. In some examples, the data transmission system 104 may fit into a slot formed in a midsole or other portion of an article of footwear 102 using structures of the type used for releasably securing memory cards, PCMCIA cards, and/or other devices with electronic or computer devices.

The data transmission system 104 may include one or more data transmission elements 104a capable of electronic communication and data transfer with one or more remote devices 106 (e.g., communication and data transfer with a reception element 106a provided with the remote device 106). Electronic communications in any form, using any data transfer forms, formats, and/or protocols, may be used without departing from this invention. As examples, the data transmission element 104a and/or data reception element 106a may communicate with one another in wired or wireless manners without departing from this invention. As some more specific examples, the data transmission element 104a may communicate with the data reception element 106a (and vice versa) via radio transmissions, cellular telephone transmissions, infrared radiation transmissions, or the like. Also, if desired, each of the data transmission system 104 and the data reception or remote system 106 actually may be capable of both sending and receiving data, to thereby enable two way communications between the data transmission system 104 and the remote system 106 without departing from this invention (e.g., to further enable data input to the data transmission system 104 and/or its various components, if necessary or desired, for example reasons to be explained in more detail below, etc.).

Figure 2A:
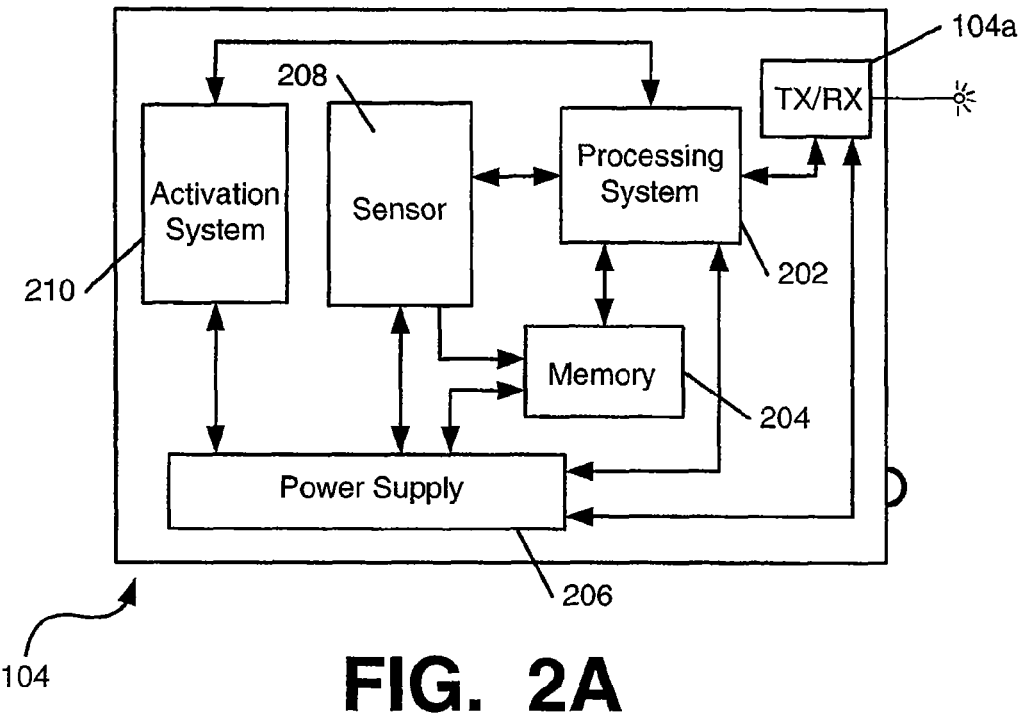
FIGS. 2A and 2B are schematic diagrams illustrating example components that may be included and/or used in data transmission systems useful in systems and methods according to at least some examples of this invention.

FIG. 2A includes a schematic diagram of an example data transmission system 104 that may be used in accordance with at least some examples of this invention. While the example structures of FIGS. 1 and 2A illustrate the data transmission system 104 as a separate, stand alone component that may be included as part of a footwear structure 102, those skilled in the art will appreciate that all of the components and elements of a data transmission system 104 useful in accordance with at least some examples of this invention need not be contained within a single housing, mounted on a single, board, or otherwise contained in a single package. Rather, if desired, various components or elements of the data transmission system 104 may be separate from one another, in different housings, on different boards, and/or separately engaged with the article of footwear 102 in a variety of different manners without departing from this invention.

In the example of FIG. 2A, the data transmission system 104 includes a data transmission element 104a for transmitting data to a remote system as described above in conjunction with FIG. 1. The system 104 of this example further includes a processing system 202 (e.g., one or more microprocessors), a memory system 204, and a power supply 206 (e.g., a battery or other power source). A "sensor" 208 may be provided to sense a wide variety of different types of parameters, such as physical or physiological data associated with use of the article of footwear 102, such as pedometer type speed and/or distance information, other speed and/or distance data sensors, temperature, altitude, barometric pressure, humidity, GPS data, heart rate, pulse rate, blood pressure, body temperature, EKG data, EEG data, etc., and this data may be stored in memory 204 and/or made available, for example, for transmission by the transmission element 104a to some remote location or system.

As further shown in FIG. 2A, the data transmission system 104 of this example structure includes an activation system 210. The activation system 210 may be engaged with the article of footwear 102, together with or separate from other portions of the data transmission system 104, and the activation system 210 may be used for activating the data transmission system 104 and/or at least some functions of the data transmission system 104 (e.g., data transmission functions, etc.). A wide variety of different activation systems may be used without departing from this invention. For example, in at least some example systems and methods according to this invention, the activation system 210 will be used to activate at least some data transmission functions when a user steps down in the article of footwear 102, e.g., when taking a step when walking or running, or optionally, when a user steps down hard in the article of footwear 102, e.g., when landing a jump or stomping in the article of footwear 102. If necessary or desired, the data transmission system 104 and/or the activation system 210 may be programmed and adapted such that at least some minimum threshold amount of force must be applied to the article of footwear 102 (e.g., contact between the sole member 102b and a contact surface, contact between the user's foot and the sole member 102b, etc.) before data transmission functions will be activated (e.g., to avoid sending out data with each and every step and/or with each and every minor motion of the foot within the article of footwear 102). Optionally, if desired, the data transmission system 104 may include an ON/OFF switch or other switching mechanism so that data transmission can be turned off, if desired, e.g., for airline or hospital use, to conserve power supply strength (e.g., battery power), when not competing or exercising, etc. While additional and some more specific examples of data transmitted and its use will be described in more detail below, if desired, the activation system 210 may be used to activate the data transmission system 104 to send out any desired type of information, including physical and/or physiological data of the types described above, data used for monitoring athletic performance, data used for providing targeted or customized advertising, etc.

A wide variety of different types of activation systems may be used without departing from this invention. As examples, as mentioned above, the activation system 210 may be used to sense contact between the article of footwear and a surface and/or a user's foot, e.g., during use while walking, running, jumping, stomping, etc. More particular examples of activation system 210 structures that may be used in accordance with at least some examples of this invention include: an accelerometer (e.g., to sense changes in velocity, acceleration, or foot movement direction in response to a step, jump, stomping action, etc.); a piezoelectric element (e.g., to sense contact pressure between the shoe and a contact surface, to sense contact pressure between the foot and a portion of the sole member, etc.); a Hall sensor system or other magnetic sensor system (e.g., to sense changes in a magnetic field, for example, due to compression of a midsole or other portion of the sole member, as described, for example, in U.S. Patent Published Appln. No. 2004/0177531, which publication is entirely incorporated herein by reference); a button or switch (e.g., activated manually, activated by a user's step, activated by contact between the sole member and a contact surface, activated by contact between the sole member and a user's foot, etc.); or the like. As another example, if desired, the activation system 210 may include a radio frequency identification system ("RFID" system) wherein exposure of the activation system 210 to radio waves will induce transmission of a signal. Optionally, if desired, a single RFID system may be used as both the data transmission system 104 and the activation system 210 wherein exposure of the RFID system antenna to radio waves of the proper frequency will induce a radio transmission, including the desired data, to a remote system 106.

Accordingly, and as described above, in accordance with at least some examples of this invention, the activation system 210 will include some sort of input system that accepts input from an external source or stimulus, and receipt of this input, optionally when it meets one or more threshold criteria (e.g., sufficient force, proper frequency, proper strength, etc.), can be used to initiate activation of the data transmission system 104 or data transmission element 104a. In at least some examples of systems and methods according to this invention, the external input system will receive input in a wireless manner, such as via a radio antenna (e.g., for the RFID systems described above), via a magnetic sensor (e.g., for the Hall sensor systems or other magnetic sensor systems described above), via a pressure sensor (e.g., for the piezoelectric or other contact sensing systems described above), via speed, direction, or acceleration changes (e.g., for the accelerometer based systems described above), etc. Alternatively, if desired, input may be received via a wired connection between an external input source and the activation system 210 included with the article of footwear 102.

Figure 2B:
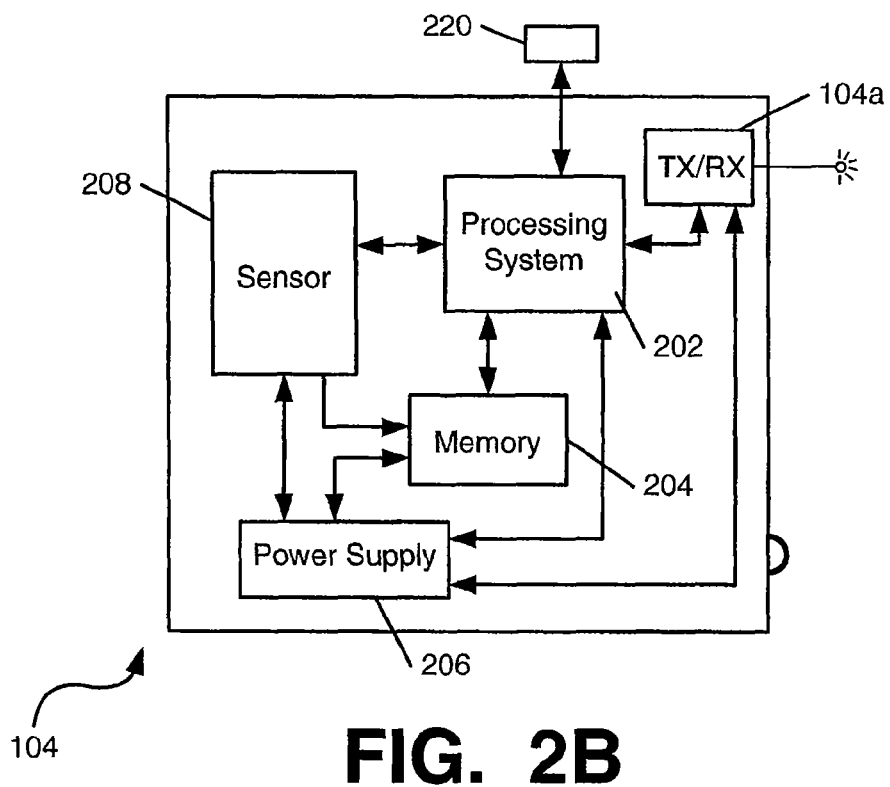

FIG. 2B illustrates a schematic diagram of another example data transmission system 104 in accordance with at least some examples of this invention. This system 104 includes a data transmission element 104a, processing system 202, memory system 204, power supply elements 206, and sensors 208, e.g., of the types generally described above in conjunction with FIG. 2A. In this example system 104, however, the activation system 220 is provided separate from the remainder of the data transmission system 104. When separated in this manner, input from the activation system 220 may be provided to the data transmission system 104 in any desired manner, e.g., to processing system 202 via a wired or wireless connection. The input from the activation system 220 also may be provided in any desired form or format without departing from the invention, for example, in the various forms and formats described above. As additional examples, if desired, the activation system 220 may constitute a simple button, switch, or other input source that simply provides an activation signal to the processing system 202 of the data transmission system 104 (e.g., a logical "1"). If desired, in at least some examples according to this invention, the activation system 220 may constitute an external button or other device, optionally mounted on the article of footwear 102 or otherwise carried by the user, that a user can manually activate or can otherwise be activated (optionally automatically activated when a user steps down, stomps, lands a jump, etc.), to induce the data transmission system 104 to transmit data. Of course, if desired and as noted above, other portions of the data transmission system 104 may be located or housed separate and independent from one another without departing from this invention.

Figure 3:
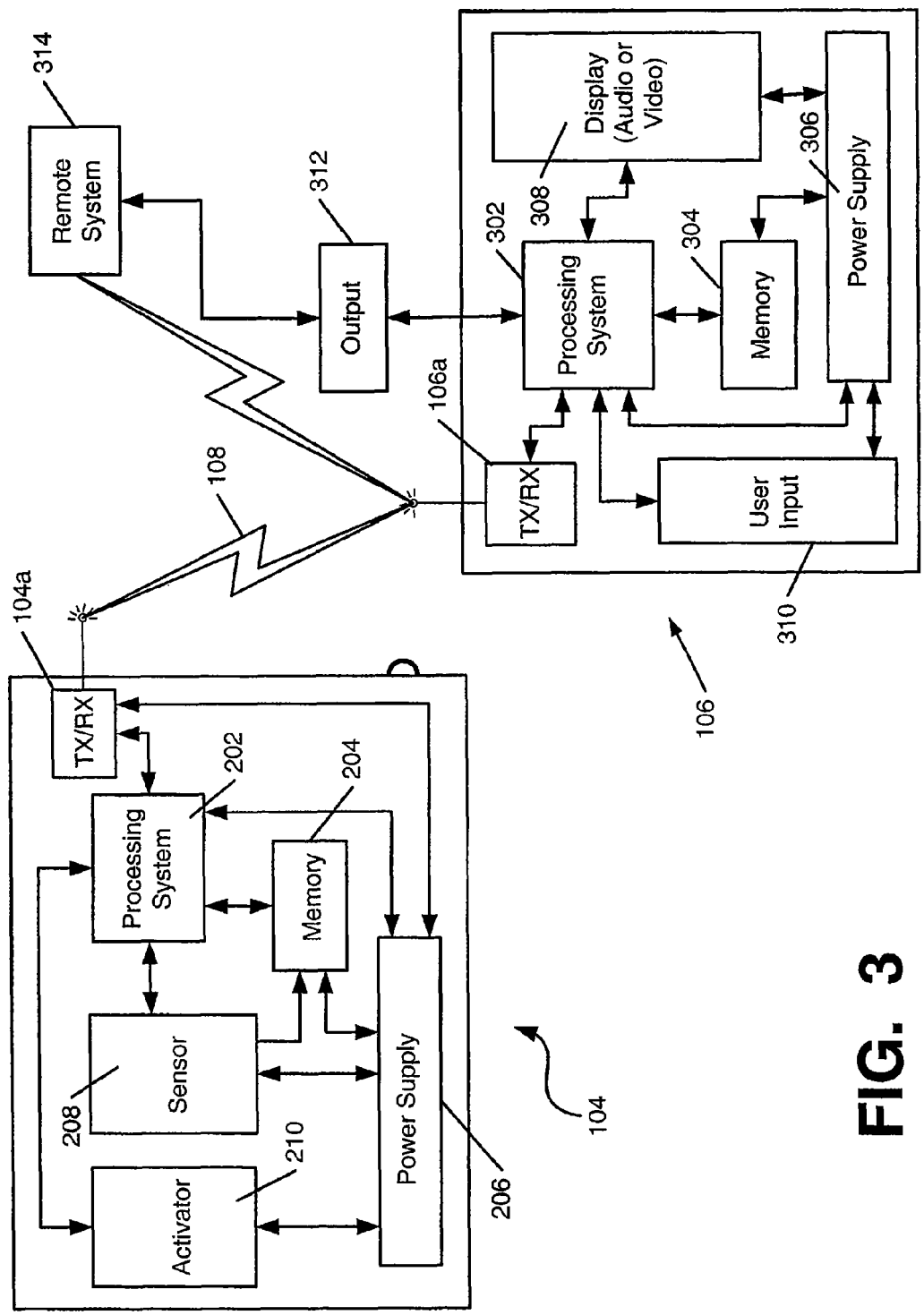
FIG. 3 is a schematic diagram illustrating example components that may be included and/or used in footwear and/or data transfer systems and methods according to at least some examples of this invention.

FIG. 3 includes a schematic diagram illustrating various example components and features of the example system 100 shown in FIG. 1. This example system 100, as described above in conjunction with FIGS. 1 and 2A, includes a data transmission system 104 and a remote device 106 for receiving data transmitted by the data transmission system 104. The remote device 106 may include its own processing system 302 (e.g., one or more microprocessors), a memory system 304, and a power supply 306, as illustrated in FIG. 3.

The remote device 106 may be programmed and adapted to perform various functions in accordance with examples of this invention. For example, the remote device 106 may include an audio, video, and/or alphanumeric display device 308 for displaying information, e.g., to the footwear user or to a third party, wherein the displayed information is based, at least in part and in some instances, on the data transmitted by the data transmission system 104. Additionally or alternatively, if desired, the remote device 106 may include a user input system 310, for receiving user input, e.g., to enter or adjust settings, to control the functions or settings of the remote system 106 or various components thereof, and/or to enter settings or control the functions of the data transmission system 104 or the various components thereof (such as the activation system 210, the sensing system 208, etc.). If desired, user input or other data or information accepted and/or generated by the remote system 106 may be transmitted back to the data transmission system 104 and/or to one or more other systems (e.g., remote system 314) via data reception element 106a (assuming that this reception element 106a also has data transmission capabilities). Alternatively or additionally, if desired, user input or other data or information generated by the remote system 106 may be sent to the data transmission system 104 and/or to one or more other systems (such as remote system 314) via output system 312 (e.g., a data transmission line, a wireless transmission system, etc.). The remote systems may take on any desired form without departing from the invention, such as a computer or computing system, a remote display device, another data transmission system, or the like. Connections between remote system 106 and remote system 314 may take on any desired form, such as wired or wireless connections, and the data may be transferred in any desired form or format without departing from this invention.

Figure 4:
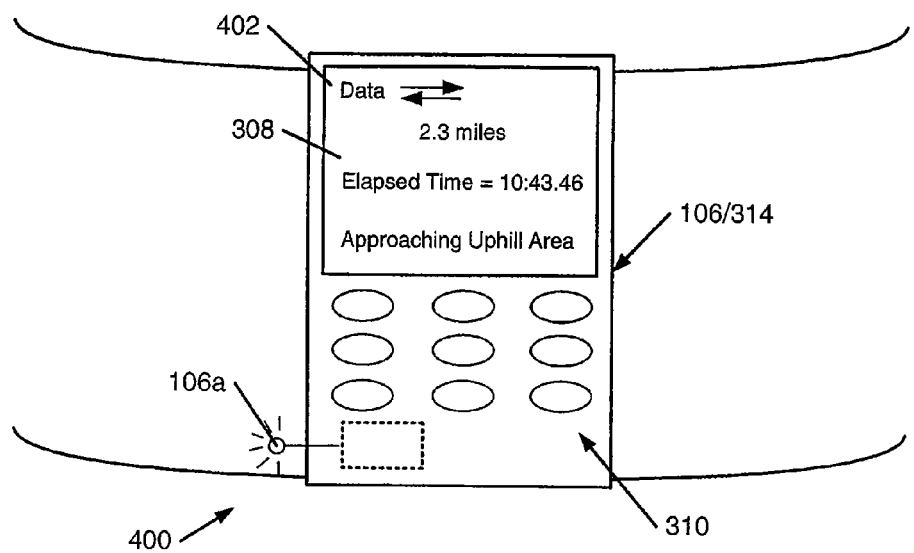
FIG. 4 illustrates an example remote display device that may be used in systems and methods according to at least some examples of this invention.

FIG. 4 illustrates an example of a remote system 106 (or 314) that may be provided in accordance with at least some examples of this invention. As shown, in this example, the remote system 106 (or 314) takes on the form of a watch or other wearable electronic device 400, optionally wearable by the user of the article of footwear 102. The watch 400 may include a wireless receiver 106a for receiving data from a data transmission system 104 associated with an article of footwear. The watch 400 of this example further includes a display device 308 that can be used to display various types of information to the user, such as distance and/or speed information, elapsed time information, route warning information, physical or physiological data associated with the workout, etc. The information displayed to the user, as will be described in more detail below, may be based, at least in part and in some instances, on information sent in response to the activation system 210 or 220 activating the data transmission system 104. As shown in FIG. 4, this watch 400 further may include user input devices 310 in the form of a series of buttons through which the user can input data to control the settings, features, or functions of the 400, the data transmission system 104 or its various components, and/or another remote system. Of course, other user input systems may be included without departing from the invention, such as stylus and digitizer inputs, voice inputs, and the like.

FIG. 4 illustrates another example feature that may be included with at least some examples of systems and methods according to this invention. Specifically, as shown in FIG. 4, the display 308 may include an icon 402 or some other appropriate type of indicator (e.g., an activated LED or other light source, a light of a certain color, a vibration source, an audio element, an LCD display, or the like) to indicate when data is being exchanged between the remote system 106 and the data transmission system 104. This icon 402 or other indicator may be activated, for example, whenever the activation system 210 has activated the data transmission system 104 to send data to the remote system, whenever there is an active link between the transmission system 104 and remote system 106, etc. In this manner, the user can readily see when data exchange is taking place. Other indicators for other purposes also may be included in the watch 400 (or other remote system) without departing from this invention.

Figure 5:
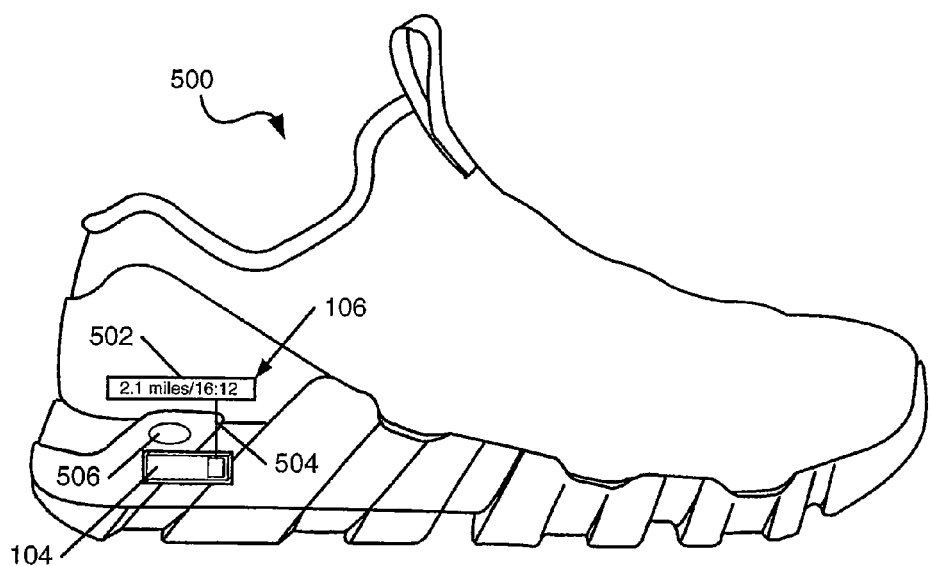
FIG. 5 illustrates an example article of footwear including a display device that may be used in systems and methods according to at least some examples of this invention.

FIG. 5 illustrates another example remote system 106 that may be provided in accordance with at least some examples of this invention. In this instance, the remote system 106 is included as part of an article of footwear structure 500. Data from the data transmission system 104 in this example structure is transmitted to the remote system 106 via a wired connection 504, received by the remote system 106, and used to provide a display on a display device 502 included as part of the remote system 106 (e.g., an LCD display, such as an alphanumeric display as used in pagers, telephones, or the like). If desired, a button 506 may be provided as part of the activation system, e.g., to send a signal to the data transmission system 104 to send mileage data, elapsed time data, and/or other desired data to the remote system 106 for display (e.g., a user could activate this feature at the end of a run, to get total mileage on the shoes, etc.). Of course, various other activation systems, like those described above, also may be used with this footwear structure 500 without departing from this invention.

Systems and methods according to examples of this invention may be used to generate, transmit, and utilize a wide range of different types of data for a wide range of purposes. Various more specific examples of activation of the data transmission system 104 and/or uses of the transmitted data are described below in conjunction with FIGS. 6-10.

Figure 6:
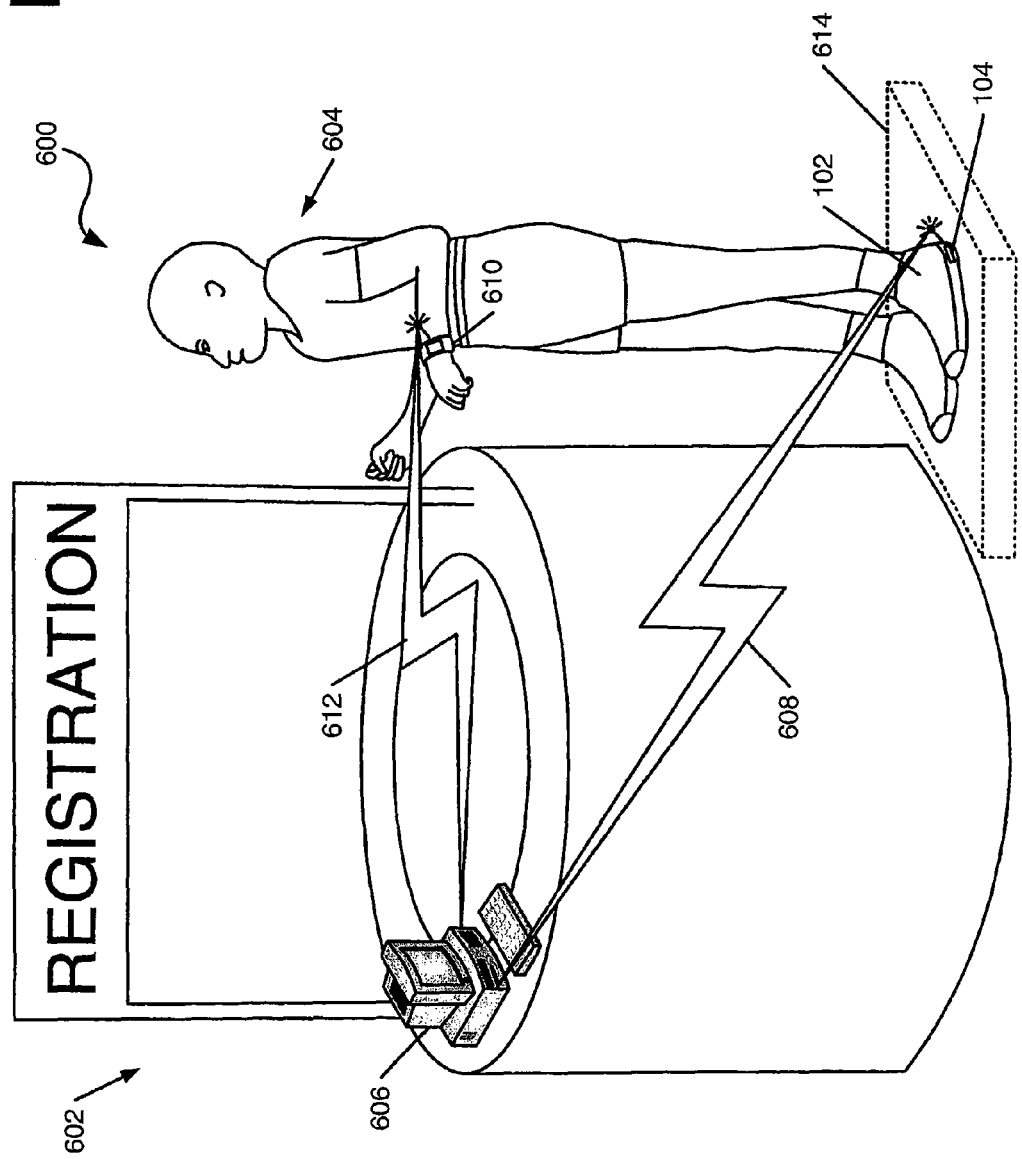
FIGS. 6 through 10 illustrate various examples of environments in which systems and methods according to at least some examples of this invention may be used.

In accordance with at least some examples of this invention, footwear and data transfer systems and methods, like those described above, may be used for race, athletic event, competition, and/or other registration purposes. FIG. 6 illustrates an example of such a system 600. Specifically, FIG. 6 illustrates a registration kiosk 602 that may be used, for example, at a race, competition, tournament (e.g., a golf tournament, baseball tournament, etc.), or other locale, e.g., for registering athletes that will participate in the event. As shown in FIG. 6, in this example of the invention, the athlete 604 wears an article of footwear 102 that includes a data transmission system 104, e.g., of the types described above in connection with FIGS. 1-3 and/or 5. When the athlete 604 approaches the registration kiosk 602, the activation system of the data transmission system 104 may be activated, which induces the data transmission system 104 to transmit data to the remote computer system 606 (e.g., by wireless transmission, as shown by transmission arrow 608). While the data transmission system 104 may be programmed and adapted to transmit any desired data content, the data transmitted by the data transmission system 104 in this example may include at least data identifying the athlete 604 wearing the article of footwear 102. If desired, the data transmission system 104 may itself transmit all of the data necessary to register the athlete 604 for the event. Alternatively, if desired, the data transmission system 104 may simply transmit information identifying the athlete 604, and the computer system 606 may include or be capable of obtaining all of the necessary registration information for the athlete 604 based on the transmitted identification information (e.g., the computer system 606 may look up the necessary data from a table, obtain the information from memory or a network link, etc.). This system 600 provides quick, easy, and automated event registration and allows the athlete 604 to attend to more pressing needs, such as preparing for the event, warming up, media or fan relations, etc.

If desired, as the data transmission and/or registration process proceeds, the computer system 606 (or the data transmission system 104) may send a signal or data to another remote device, such as an athlete carried remote device 610 (such as a watch), as illustrated, for example, by transmission arrow 612 in FIG. 6. As described above in conjunction with FIG. 4, this signal or data may advise the recipient that registration data is being transmitted, that registration is taking place, that registration is completed, and/or any desired information.

Any desired manner of activating the data transmission system 104 and triggering it to send data to the computer system 606 may be used without departing from this invention. For example, as shown in FIG. 6, as the user 604 approaches the registration kiosk 602, he or she may step onto an area that includes an external input source 614 for activating the activation system includes as part of the data transmission system 104. As more specific examples, the external input source 614 may include a magnet (e.g., a permanent magnet and/or an electromagnet) that provides a magnetic field and/or changes a magnetic field detected by a magnetic sensor, such as a Hall sensor system, included as part of the activation system (e.g., a magnetic sensor included as part of the data transmission system 104 and/or on the article of footwear 102, etc.). In response to the detected magnetic field and/or changes in the detected magnetic field, a magnetic sensor included as part of the activation system may trigger the data transmission system 104 to send information to the remote computer system 606 identifying the athlete 604 (and thus initiate the event or competition registration process). As another example, if desired, external input source 614 may include a radio wave source that induces an RFID system included as an activation system in the data transmission system 104 to send a signal to the remote computer system 606 identifying the athlete 604 (and thus initiating the event or competition registration process). If desired, in this example structure, an RFID system may be used both as the activation system and as the data transmission system 104. Alternatively, if desired, the RFID system could be used only as the activation system and a different data transmission system 104 may be used to send the identifying data to the remote computer system 606 in response to output from the RFID system.

As still another example, if desired, a user may actively take action to trigger the activation system and thus initiate the data transfer. For example, if desired, the user could stomp his or her foot, jump up, and other otherwise initiate solid contact between the article of footwear 102 and the surface 614 or the ground. This action may be detected, e.g., by an accelerometer, a piezoelectric sensor, or a contact element provided as part of the shoe 102 or data transmission system 104 structure, and this detected action may be used to trigger the data transmission system 104 to transmit the identifying data to remote computer 606. As another example, if desired, an athlete 604 could initiate the data transfer process and activate the data transmission system 104 by pressing a button, e.g., on the article of footwear 102, on the athlete carried remote device 610, on the kiosk 602, on the contact surface 614, on the remote computer 606, etc. Of course, a wide variety of other activation systems and/or changes or modifications to the activation systems described above may be provided without departing from this invention.

Also, while this registration system 600 has been described in terms of registering athletes 604 for athletic events or competitions, it may be used for a wide variety of different purposes without departing from the invention. In general, systems of the type described above with reference to FIG. 6 may be used at any desired time and/or in any desired situation in which one desires to confirm the presence of a person at a particular location, and the person's presence at that location may be used by the remote computer system 606 to trigger a wide variety of actions. As additional examples, if desired, use of this type of registration system, e.g., registration kiosk 602, may be used to confirm the user's presence at a gym, retail location, a convention booth, or any other desired location, e.g., for prize or reward purposes (e.g., a company may provide discount coupons, prizes, or other awards when users use their footwear or equipment to keep in shape, e.g., for promotional purposes, for advertising purposes, as incentives, etc.), for contest purposes, for use tracking purposes, etc. As still additional examples, if desired, registration systems of this type may be placed at individual pieces of athletic equipment, e.g., at a gym or spa, to enable more precise tracking of the athlete's use of equipment, his/her training regiment, etc., for games, rewards, or contest purposes, etc.

Figure 7:
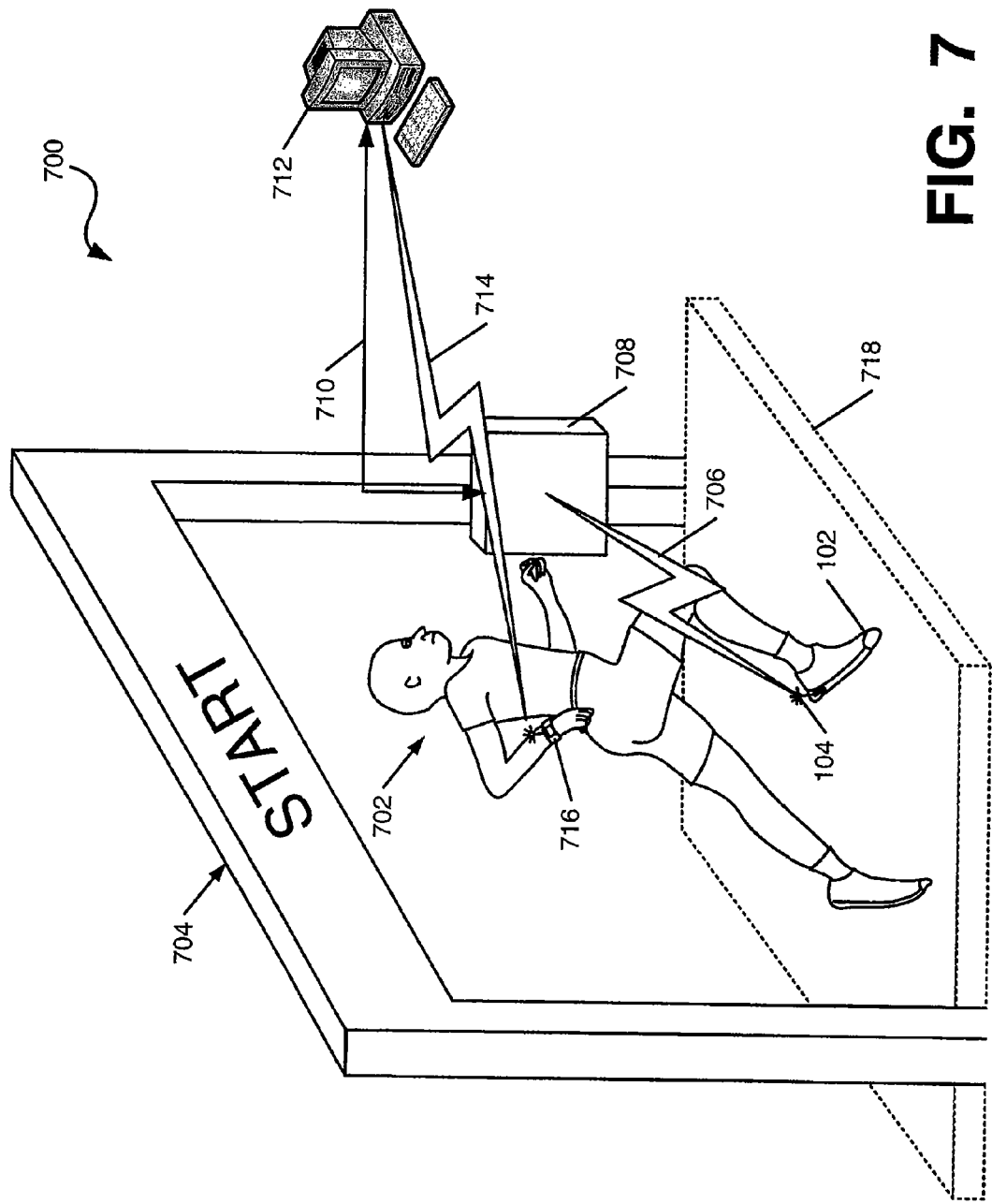

FIG. 7 illustrates another example of use of systems and methods according to at least some examples of this invention. In addition to confirming a user's presence at a specific location as described above in conjunction with the system of FIG. 6, systems and methods according to at least some examples of this invention may be used to confirm a user's presence at a specific location and at a specific time. As shown in FIG. 7, a system 700 in accordance with this example aspect of the invention may be used, e.g., at the start of a race or other event, to confirm when the athlete 702 actually starts the race or event (e.g., when he/she physically crosses the start line). In the example system 700 shown in FIG. 7, as the athlete 702 wearing an article of footwear 102 including a data transmission system 104 crosses the start line 704 of an event, an activation system included with the data transmission system 104 and/or the article of footwear 102 sends a signal or otherwise activates the data transmission system 104, inducing it to send out data, as shown by transmission arrow 706. The transmitted data, which may include athlete 702 identification information and/or other desired information, may be sent to a remote system 708 (which may include one or more processing systems, such as a computer system) that includes a clock, and the remote system 708 then may record the athlete's start time for the event. Optionally, if desired, the remote system 708 may simply include a data transmission system that sends data (represented by wired connection 710) to another remote system 712 that records the athlete's presence and correlates it with the athlete's starting time for the event. Of course, any type of connection between remote system 708 and remote system 712, if any, may be used without departing from the invention, including wireless connections, network connections, etc. Additionally, if desired, the second remote system 712 may be eliminated and all processing may be performed by remote system 708.

Optionally, if desired, one or more of the remote systems 708 and/or 712 may send data and/or information back to the athlete 702, and/or they may send data and/or information to another destination. FIG. 7 illustrates, as an example, the remote system 712 sending data and information back to the athlete (as represented by transmission arrow 714), e.g., to a user carried remote device 716, such as a watch. The user carried remote device 716 may include a display to provide information to the athlete, such as his/her start time information, it may activate a stop watch included with the device 716, etc. Any type of data or information may be sent to the athlete 702 without departing from this invention.

Again, many ways of activating the data transmission system 104 may be used without departing from this invention. For example, if desired, the start line 704 may include an external input source 718, such as a radio wave source or a magnetic field source, and this external input source 718 may be used to trigger the activation system and/or induce transmission of data by the data transmission system 104, as described above in conjunction with FIG. 6 (e.g., trigger an RFID system, a Hall sensor system, a magnetic sensor system, etc.). As additional examples, contact between the article of footwear 102 and the ground surface may be detected (e.g., by an accelerometer, a piezoelectric element, a contact detection system, etc.), and this detection may be used to trigger the data transmission system 104 (e.g., optionally with each step) to transmit data, as described above in conjunction with FIG. 6. As also described above in conjunction with FIG. 6, the data transmission system 104 may transmit user identification information and/or any other desired type of information or data without departing from this invention.

As another potential alternative, if desired, the data transmission system 104 may transmit data relating to the athletic performance, e.g., instead of or in addition to user identification data. As more specific examples, if the article of footwear 102 or the data transmission system 104 included a clock or timer, activation of the data transmission system 104 could be used to send the athlete's start time (or other timing information) to the remote system 708 and/or 712 (e.g., as illustrated by transmission arrows 706 and/or 710). As additional examples, if the article of footwear 102 or the data transmission system 104 (or other available system) included sensors or has access to data from sensors of physical or physiological data associated with the athletic performance (e.g., pedometer based speed and/or distance information, other speed and/or distance information, GPS information, heart rate information, pulse rate information, body temperature information, ambient temperature or humidity information, etc.), activation of the data transmission system 104 could be used to send this type of physical and/or physiological data to the remote systems 708 and/or 712 (e.g., as illustrated by transmission arrows 706 and/or 710). Additionally, if desired, the remote systems 708 and/or 712 may send data or information back to the athlete 702 or to another system, at least in part, based on the information originally sent by the data transmission system 104.

Of course, use of this type of system 700 is not limited to the starting line of a race or event. Similar systems 700 could be placed at the finish line, to record the athlete's finish time, as well as at intermediate locations along the route, to record the athlete's intermediate split times (and optionally to provide the finish and/or split time information back to the athlete 702, as described above). Alternatively, for races or events that take place along a circuit or track, athletes may pass the start line plural times during an event and/or the start line also may act as the finish line. Systems 700 of the type described above may be used in this situation to record start, finish, and/or split times and/or to provide this information back to the athlete 702 without departing from the invention. Additionally, systems 700 of the type described in conjunction with FIG. 7 may be used to determine the athlete's location along a route and/or to provide route or other information to the athlete 702 along various portions of the route, for example, to warn the athlete 702 of approaching uphill stretches, downhill stretches, curbs, steps, or curved areas; to advise of approaching water or first aid stations; to warn of approaching inclement weather or other hazardous conditions; to advise of approaching wet or slippery route conditions; to warn of approaching track change conditions (e.g., pavement changing to dirt, grass, etc.); and the like. Also, use of systems of the types described in conjunction with FIG. 7 is not limited to foot races, but rather may be used in a wide variety of athletic events and/or other endeavors in which a person's location and/or timing with respect to a specific location may be useful as a trigger for transmitting information.

Figure 8:
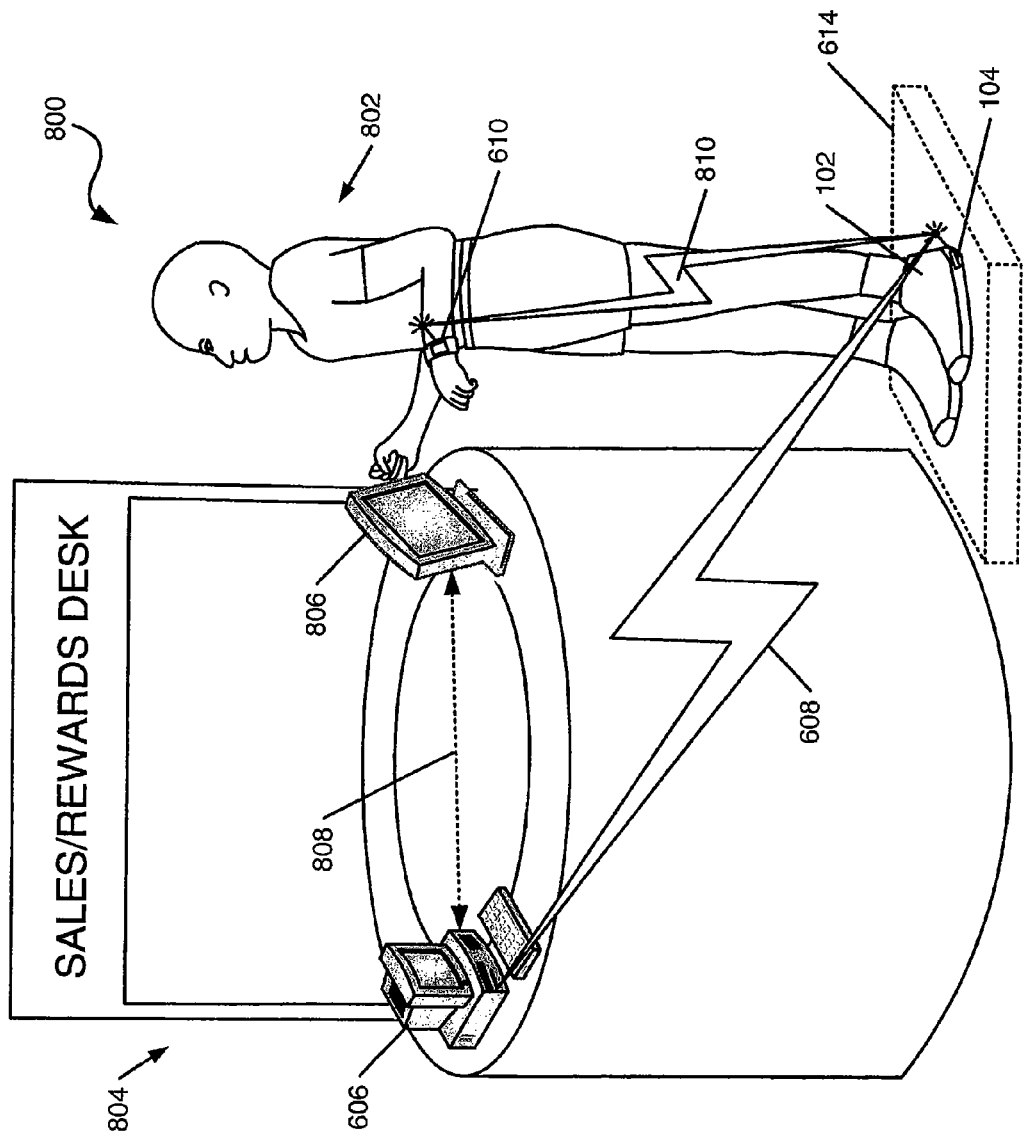

FIG. 8 illustrates another potential use of a system 800 in accordance with at least some examples of this invention. The system 800 of FIG. 8 is similar to the system 600 of FIG. 6, at least with respect to the manner in which the data transmission system 104 on the article of footwear 102 may be activated, the manner in which the data transmission system 104 communicates with the remote system 606, and the like. The system 800 in the example environment illustrated in FIG. 8 is used for sales, promotions, games, contests, rewards, and the like. As more specific examples, a footwear or athletic equipment or apparel manufacturer may sponsor a game or contest challenging users of their products to meet certain goals or satisfy certain requirements for which they may receive points, win prizes, receive discounts on products, obtain coupons, receive recognition, etc. The system 800 of FIG. 8 relates to a location (such as a "Sales/Rewards Desk" location 804) at which the user 802 may go, e.g., to register for the contest or game, to check his/her status in the contest game or contest, to confirm his/her presence at the location, to redeem or receive prizes in the game or contest, etc.

As some more specific examples, when a user 802 buys a new pair of shoes 102 including a data transmission system 104, e.g., of the types described above, he or she may register for a contest (e.g., using a location 804), for example, that challenges or provides incentives for the user to use the new shoes 102 for workout purposes, e.g., to run 100 miles in the new pair of shoes 102 within the next month (or optionally to meet any goal, even user defined goals, or partially user defined goals). At the time the user 802 originally registers, the data transmission system 104 may transmit user or footwear identification information, time and date information, and a base mileage on the shoes 102 (e.g., 0 miles). In this example system, the article of footwear 102 may be equipped with a pedometer based (or GPS or other) speed and distance monitoring capabilities (e.g., as sensor 208 from FIGS. 2A and 2B) that tracks the user's mileage as he or she uses the shoes 102. At intermediate times during the game or contest time period, a user 802 may approach a location 804 of the types described above, e.g., to check his or her progress in the challenge, receive additional information or additional challenges, to communicate with fellow competitors, to check standings, etc. For example, when the user 802 approaches location 804, the data transmission system 104 on the article of footwear 102 may be activated to again transmit user or footwear identification, date, and mileage information to the remote computer system 606. The remote computer system 606 may activate its own display or a remotely located display 806 to display status and/or other information to the user 802 (as shown by transmission arrow 808), such as the accumulated mileage, the remaining distance to cover, the remaining time left in the challenge, etc. Additionally, remote system 806 may be capable of receiving user input, e.g., via a keyboard, stylus, touch screen, voice input, etc. If the user has met the challenge goals, the display system 806 may indicate this success, and the remote system 606 or the user 802 may take steps to assure that the user 802 receives the appropriate prize or recognition.

Of course, a wide variety of different types of contests, competitions, and systems of this type may be arranged without departing from this invention. Moreover, such contests, competitions, and the like may be set up so that users compete against one another. As additional potential alternatives, users may be provided with input systems, software, or other components that enable them to design their own games, competitions, contests, and/or challenges, optionally with multiple participants, so that the games, competitions, contests, and/or challenges can be better tailored to the participants' skill levels, goals, desired workout parameters or conditions, etc. Therefore, locations 804 of the types described above may be available in the user's home, office, gym, or other workout locations. If desired, data collected and obtained at multiple locations 804 for a single contest may be transmitted over a network (e.g., the internet) for maintenance of a single master database for the contest (e.g., multiple remote systems 606 from multiple locations may collect data and transmit it over a network to a single computer (e.g., server, etc.) that maintains the data for the user(s)).

Also, a wide variety of electronic components, communication set ups, and interactions may be used in contest and/or gaming situations like those described above in conjunction with FIG. 8 without departing from this invention. Additionally, if desired, in at least some instances or at least some times, the data transmission system 104 on the article of footwear 102 may be used to send at least some information directly to the user 802 (e.g., to user carried display device 610 as illustrated by transmission arrow 810) without use of the intermediate remote computer system 606, e.g., to send shoe mileage information, contest status information, etc., without departing from this invention.

Aspects of this invention may be used in a wide variety of environments including environments other than those described above in conjunction with FIGS. 1-8. For example, the data transmission system 104 may transmit data other than user identification information and/or the other data described above. As one more specific example, the data transmission system 104 engaged with an article of footwear may be used to transmit data identifying the article of footwear, such as a specific GUID for the article of footwear, lot number information associated with the article of footwear, model or style information associated with the article of footwear, manufacturing data associated with the article of footwear, and/or the like.

Figure 9:
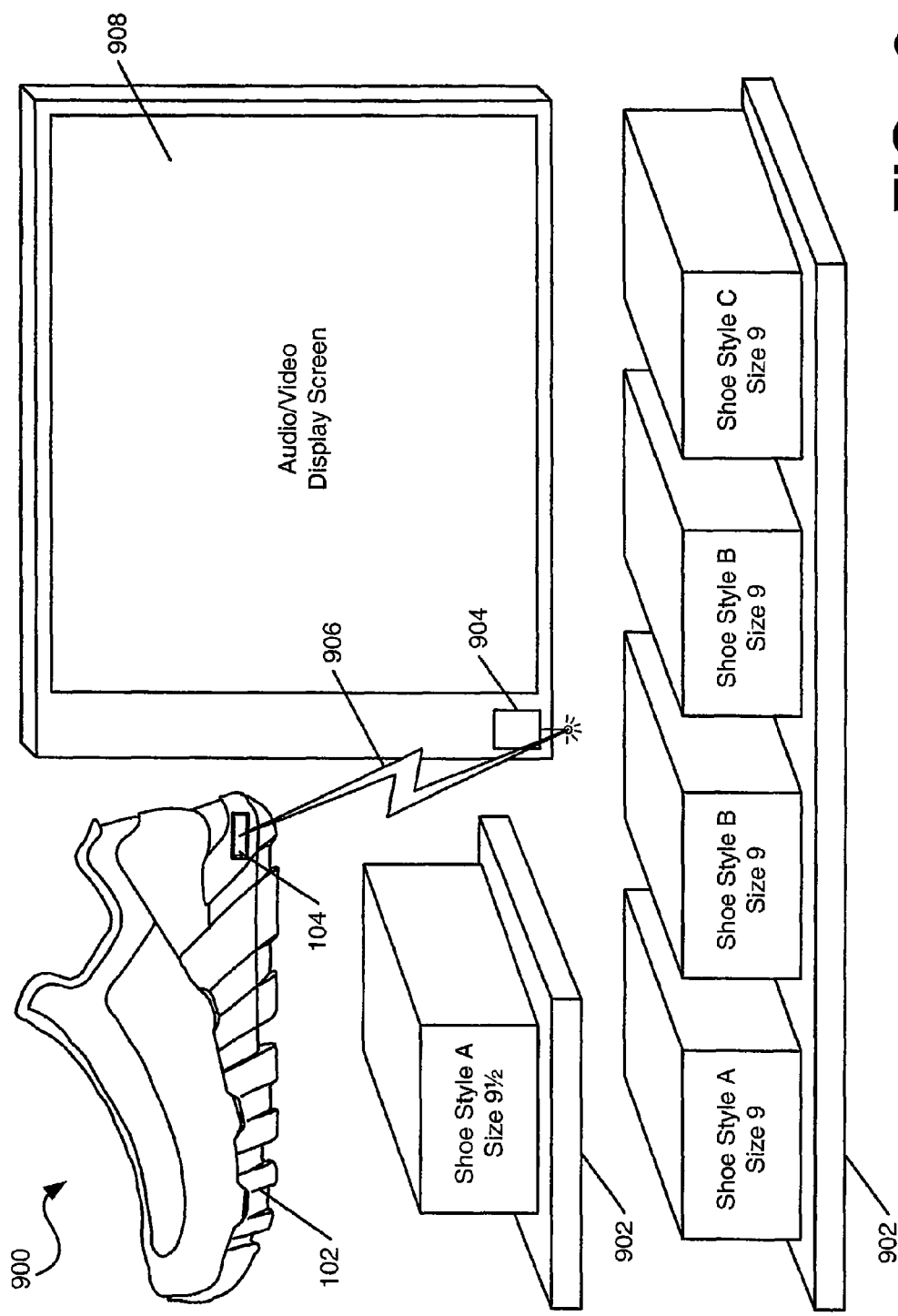

FIG. 9 illustrates an example system 900 in which transmission of data identifying an article of footwear 102 (e.g., its model, style, or the like) by the data transmission system 104 may be used by systems and methods according to at least some examples of this invention. In the example illustrated in FIG. 9, the system 900 operates in a retail or other sales location environment for articles of footwear, e.g., including articles of footwear 102 of the types described above. As shown in FIG. 9, the retail or sales location includes shelves 902 on which various shoes of different styles and sizes (or other products) are available to the purchaser, e.g., to try on, etc.

In browsing or shopping for a pair of shoes (or other products), a customer may consider purchasing a pair of shoes in which one or more of the articles of footwear include a data transmission system 104 engaged therewith, for example, as described above. Activation of the data transmission system 104 in this example system 900 (e.g., in this setting, at this location, etc.) may be used to send data to a remote system 904 (as illustrated by transmission arrow 906) identifying the type of shoes that the customer is considering for purchase. This activation may occur in any desired manner, including in the various manners described above (e.g., exposure to radio waves to activate an RFID system, exposure to a magnetic field or a changing magnetic field to activate a magnetic sensor, through contact with a surface, through a manual button, etc.).

Once the remote system 904 receives the data identifying the style or type of article of footwear 102, this data may be used to launch an advertising or information display on display device 908, wherein the advertising or other information is specifically directed toward or related to the footwear product 102 from which the data was originally sent. In this manner, customers can quickly and easily receive the most relevant product and/or advertising information relating to the products of specific interest. Additionally or alternatively, if desired, the advertising or product information displayed in response to data transmitted by data transmission system 104 need not be limited to footwear that this specific customer might be interested in purchasing, but the displayed information may include advertising or product information for clothing, equipment, and the like, and/or discount offers and/or coupons for such products, etc., based on the type of footwear that the customer is considering for purchase.

Optionally, if desired, the remote system 904 also may receive information identifying the specific potential purchaser and/or information regarding the customer's past use of their articles of footwear (e.g., customer ID and/or mileage information from a data transmission system 104 associated with the customer's existing shoes (e.g., the ones he or she is seeking to replace), from another source, etc.). In such systems 900, the advertising or other product information also may be tailored toward the specific potential purchaser, e.g., to include his or her name, tailored to the activities in which he or she tends to participate, etc.

As another alternative, targeted advertising and/or other information of the types described above also may be used in conjunction with systems like those described above in FIG. 8. For example, when a user comes into a retail or other sales location wearing an article of footwear 102 having a data transmission system 104, data from the articles of footwear 102 may be transmitted to the remote system 606 including, for example, user identification information, original shoe purchase date, shoe mileage, shoe usage information (e.g., speed, average run distance, etc.), etc. The remote system 606 may activate advertising or product information to be displayed to the user 802 via display device 806, wherein the advertising or product information is specifically targeted to the user 802, e.g., it includes his or her name, suggests one or more potential new products to the user 802 for purchase, (e.g., based on past mileage, usage data, average running speed or distance data, etc.), and the like. The display 806 further may show the user 802 store locations and/or specific locations within the store where he/she may find the advertised products, their costs, and/or any other desired data or information relating to these products (optionally, if desired, the display 806 may give the customer the option of adding the various advertised products to a virtual shopping cart, and the user could pick up the products, e.g., at the check-out counter or a pick-up locale, at the time of or after paying for them). Additionally or alternatively, the advertising or product information presented on display 806 in response to data transmitted by the data transmission system 104 need not be limited to footwear that this specific user 802 might be interested in purchasing, but it may include advertising or product information for clothing, equipment, and the like, and/or discount offers and/or coupons for such products, e.g., based on the information indicating the user's past uses, purchases, etc.

Figure 10:
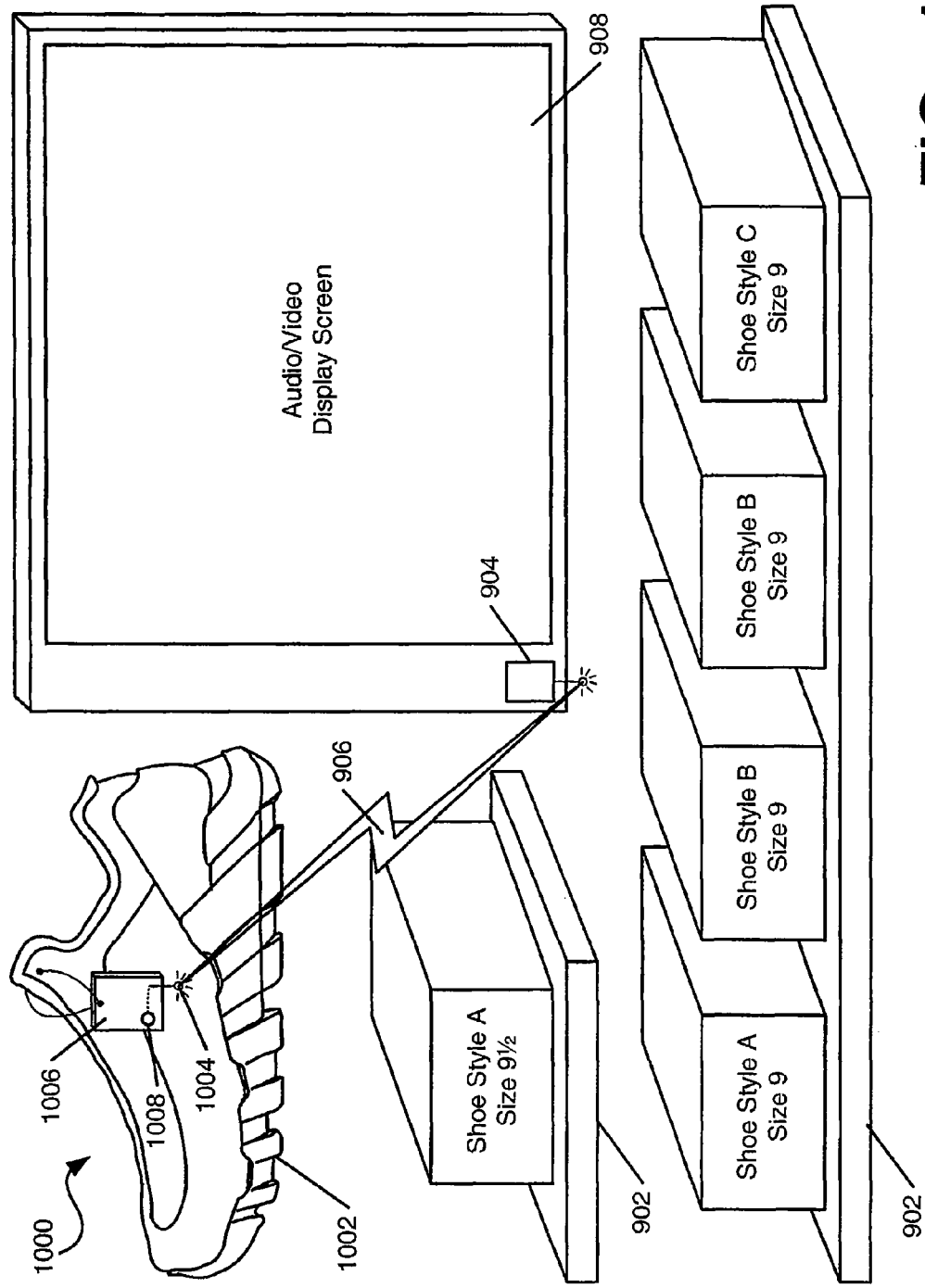

In the various examples described above in conjunction with FIGS. 1-9, the data transmission system 104 has been integrally formed with and/or releasably engaged within the structure of an article of footwear 102. While such an arrangement is useful in many examples of systems and methods according to the invention, it is not a requirement in all examples. FIG. 10 illustrates an example system 1000 in which a data transmission system 1004 is engaged with an article of footwear 1002 in a releasable manner via a tag member 1006. The tag member 1006 may be engaged with the article of footwear 1002 in any desired manner, such as via a string or loop, e.g., in the various manners in which hang tags are engaged with articles of footwear in a conventional retail or sales environment, via a clamp or clasp, etc. Alternatively, if desired, the tag member 1006 may be engaged with the closure system of the article of footwear 1002, such as by passing a shoe lace or other securing element of the article of footwear 1002 through one or more openings provided in the tag member 1006. Of course, other ways of securing the tag member 1006 to an article of footwear 1002 may be used without departing from the invention.

The data transmission system 1004 of these tag members 1006 may be activated in any desired manner without departing from the invention, including the various manners described above (e.g., using a button arrangement 1008, using other contact sensing arrangements, using magnetic field sensing, using RFID technology, etc.). While the illustrated example of FIG. 10 shows the tag member 1006, including data transmission system 1004, used in a retail or sales location and environment as described above in FIG. 9 (e.g., to activate display of targeted advertising or product information), those skilled in the art will appreciate that the tag arrangement (e.g., 1006) also may be used in various example environments and/or for various purposes, including, for example, in the various environments and for the various purposes described above in conjunction with FIGS. 6-8 (e.g., each race or contest participant may be issued a tag for use during the event). In this manner, aspects of the invention may be extended to all articles of footwear, even those not specially equipped to receive a data transmission system 104.

While aspects of this invention have been described in conjunction with various footwear products, including athletic footwear products, those skilled in the art will appreciate that aspects of this invention may be used in conjunction with a wide variety of different footwear products, including, for example: all types of shoes, boots, sneakers, sandals, thongs, flip-flops, mules, scuffs, slippers, sport-specific shoes (such as golf shoes, tennis shoes, baseball cleats, soccer or football cleats, ski boots, etc.), and the like. Additionally, aspects of this invention may be practiced with other products designed for receiving a user's foot in use, including any device into which a user places at least some portion of his or her foot (a "foot-receiving device"). In addition to all types of footwear (described above), "foot-receiving devices" include, but are not limited to: bindings and other devices for securing feet in snow skis, cross country skis, water skis, snowboards, and the like; bindings, clips, or other devices for securing feet in pedals for use with bicycles, exercise equipment, and the like; bindings, clips, or other devices for receiving feet during play of video games or other games; and the like. "Foot-receiving devices" may include foot-covering members (e.g., akin to upper members in footwear products) and foot-supporting members (e.g., akin to sole structures in footwear products). The foot-supporting members may include, inter alia, surface contacting members (e.g., akin to outsole members in footwear products).

CONCLUSION

Of course, many modifications to the specifically described structures, systems, and methods may take place without departing from this invention. For example, while the invention has been described with respect to specific examples including presently preferred modes of carrying out the invention, those skilled in the art will appreciate that there are numerous variations, combinations, and permutations of the above described systems and methods. Moreover, various specific structural features included in the examples merely represent examples of structural features that may be included in some examples of structures according to the invention. Those skilled in the art will understand that various specific structural features may be omitted and/or modified in a footwear or other foot-receiving device product without departing from the invention. Moreover, with respect to the methods, many variations in the method steps may take place, the steps may be changed in order, various steps or features may be added or omitted, etc., without departing from the invention. Thus, the reader should understand that the spirit and scope of the invention should be construed broadly as set forth in the appended claims.

I claim:

1. A footwear system, comprising:
   an article of footwear including an upper member and a sole member engaged with the upper member;
   a data transmission system engaged with the article of footwear, wherein the data transmission system transmits data from the article of footwear for receipt by a remote system, wherein the data transmitted includes footwear user identification data and footwear product identification data; and
   an activation system engaged with the article of footwear for activating the data transmission system.

2. The footwear system according to claim 1, wherein the footwear product identification data includes data identifying a model or style of the article of footwear.

3. The footwear system according to claim 1, wherein the data transmission system further transmits data indicating athletic performance information associated with use of the article of footwear.

4. The footwear system according to claim 3, wherein the athletic performance information includes at least one member selected from the group consisting of: user movement distance while using the article of footwear; user speed information while using the article of footwear; and user timing information while using the article of footwear.

5. The footwear system according to claim 3, wherein the athletic performance information is used in the game or reward program.

6. A data transfer system, comprising:
   an article of footwear;
   a first data transmission system engaged with the article of footwear, wherein the first data transmission system transmits data from the article of footwear, and wherein the data transmitted includes footwear user identification data and footwear product identification data;
   a first remote system in communication with the first data transmission system for receiving the data from the first data transmission system, wherein the first remote system includes a second data transmission system; and a second remote system for receiving data from the second data transmission system.

7. The data transfer system according to claim 6, wherein the first data transmission system further transmits data indicating athletic performance information associated with the article of footwear, and wherein the first remote system includes a display device for displaying information based at least in part on the data indicating the athletic performance information transmitted by the data transmission system.

8. The data transfer system according to claim 6, wherein the second remote system includes a portable device carried by a wearer of the article of footwear.

9. The data transfer system according to claim 8, wherein the data transmitted to the wearer of the article of footwear includes the wearer's split time information.

10. The data transfer system according to claim 6, wherein the first remote system includes a display device for displaying information based at least in part on data transmitted by the first data transmission system.

11. The data transfer system according to claim 10, wherein the information displayed by the display device in response to the data transmitted by the first data transmission system includes advertising or product information relating to the article of footwear.

12. The data transfer system according to claim 6, wherein the first data transmission system further transmits data indicating athletic performance information associated with the article of footwear.

13. The data transfer system according to claim 12, wherein the first remote system includes a display device for displaying information based at least in part on data transmitted by the first data transmission system.

* * * * *